(12) United States Patent
Jang

(10) Patent No.: US 9,491,489 B2
(45) Date of Patent: *Nov. 8, 2016

(54) METHOD OF APPLYING EDGE OFFSET

(71) Applicant: INFOBRIDGE PTE. LTD., Singapore (SG)

(72) Inventor: Min Jang, Seoul (KR)

(73) Assignee: INFOBRIDGE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,173

(22) Filed: Aug. 24, 2015

(65) Prior Publication Data

US 2015/0365668 A1  Dec. 17, 2015

Related U.S. Application Data

(63) Continuation of application No. 14/349,451, filed as application No. PCT/CN2013/070222 on Jan. 8, 2013, now Pat. No. 9,172,961.

(30) Foreign Application Priority Data

Jan. 17, 2012 (KR) ........................ 10-2012-0005334

(51) Int. Cl.
*H04N 7/12* (2006.01)
*H04N 19/86* (2014.01)
(Continued)

(52) U.S. Cl.
CPC ............ *H04N 19/86* (2014.11); *H04N 19/114* (2014.11); *H04N 19/117* (2014.11); *H04N 19/124* (2014.11); *H04N 19/14* (2014.11); *H04N 19/174* (2014.11); *H04N 19/176* (2014.11);

(Continued)

(58) Field of Classification Search
None
See application file for complete search history.

(56) References Cited

U.S. PATENT DOCUMENTS

2004/0260492 A1  12/2004  Halle et al.
2008/0298472 A1  12/2008  Jain et al.
(Continued)

FOREIGN PATENT DOCUMENTS

CN    1728182 A    2/2006
JP    2011-139961 A    6/2011
(Continued)

OTHER PUBLICATIONS

U.S. Appl. No. 14/349,451, filed Apr. 3, 2014.
(Continued)

*Primary Examiner* — Gims Philippe
*Assistant Examiner* — Dakshesh Parikh
(74) *Attorney, Agent, or Firm* — Birch, Stewart, Kolasch & Birch, LLP

(57) ABSTRACT

An apparatus of post-processing a reconstructed image is discussed. The apparatus according to an embodiment includes a deblocking filter for determining a boundary strength for each 4-sample edge which is a prediction edge or a transform edge and lies on 8×8 sample grid, determining whether deblocking filtering is applied on the 4-sample edge or not using the boundary strength and a boundary quantization parameter, and filtering the 4-sample edge if the deblocking filtering is applied on the 4-sample edge; and a sample adaptive offset adder for, if a sample adaptive offset type indicates an edge offset, generating an edge index of a current sample, generating an edge offset corresponding to the edge index to the current sample, and adding the edge offset to the current sample.

9 Claims, 8 Drawing Sheets (First Step)

(Second Step)

US 9,491,489 B2

Page 2

(51) Int. Cl.
  H04N 19/176  (2014.01)
  H04N 19/117  (2014.01)
  H04N 19/14   (2014.01)
  H04N 19/124  (2014.01)
  H04N 19/50   (2014.01)
  H04N 19/114  (2014.01)
  H04N 19/196  (2014.01)
  H04N 19/593  (2014.01)
  H04N 19/174  (2014.01)

(52) U.S. Cl.
  CPC ............ *H04N19/196* (2014.11); *H04N 19/50* (2014.11); *H04N 19/593* (2014.11)

(56) References Cited

U.S. PATENT DOCUMENTS

| | | | |
|---|---|---|---|
| 2009/0213930 A1* | 8/2009 | Ye | H04N 19/176 375/240.03 |
| 2009/0231446 A1 | 9/2009 | Lin | |
| 2012/0177103 A1* | 7/2012 | Fu | H04N 19/82 375/240.02 |
| 2012/0177107 A1* | 7/2012 | Fu | H04N 19/61 375/240.03 |
| 2013/0051457 A1* | 2/2013 | Joshi | H04N 19/147 375/240.03 |
| 2013/0077871 A1* | 3/2013 | Lu | G06K 9/36 382/197 |
| 2013/0177067 A1* | 7/2013 | Minoo | H04N 19/00006 375/240.02 |
| 2014/0369428 A1* | 12/2014 | Park | H04N 19/159 375/240.29 |

FOREIGN PATENT DOCUMENTS

| | | |
|---|---|---|
| JP | 2013-541918 A | 11/2013 |
| WO | WO 2012-092787 A1 | 7/2012 |
| WO | WO 2012-176910 A1 | 12/2012 |

OTHER PUBLICATIONS

U.S. Appl. No. 14/588,036, filed Dec. 31, 2014.
U.S. Appl. No. 14/834,153, filed Aug. 24, 2015.
U.S. Appl. No. 14/834,161, filed Aug. 24, 2015.
U.S. Appl. No. 14/834,165, filed Apr. 24, 2015.
Benjamin Bross et al., "WD4: Working Draft 4 of High-Efficiency Video Coding", Joint Collaborative Team on Video Coding (JCT-VC) of ITU-T SC16 WP3 and ISO/IEC JTC1/SC29/WG11 6th Meeting, Jul. 14-22, 2011, pp. 2-3, JCTVC-F803.
Chih-Ming Fu et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11 5th Meeting, Mar. 15-23, 2011, pp. 2-15, JCTVC-E049.
International Search Report for PCT/CN2013/070222 filed on Jan. 8, 2013.
Madhukar Budagavi, "SAO LCU boundary processing", Joint Collaborative Team on Video Coding (JCT-VC) of ITU-T SC16 WP3 and ISO/IEC JTC1/SC29/WG11 6th Meeting, Jul. 14-22, 2011, pp. 2-7, JCTVC-F232.
Nakamura et al., "Non-CE4: Compatible QP prediction with RC and AQ", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.
Narroschke et al., "CE12 Subtest 1: Results for modified decisions for deblocking", Joint Collaborative Team on Video Coding (JCT-VC) of ITU-T SG16 WP3 and ISO/IEC JTC1/SC29/WG11 7th Meeting: Geneva, Switzerland, Nov. 21-30, 2011.
Park et al., "Non-CE12: Simplified BS calculation process in deblocking filter", Joint Collaborative Team on Video Coding (JCT-VC) of ITU-T SG16 WP3 and ISO/IECJTC1/SC29/WG11 7th Meeting: Geneva, Switzerland, Nov. 21-30, 2011.
Sato, "CE4: Result of 2.3.d and 2.3.e", Joint Collaborative Team on Video Coding (JCT-VC) of ITU-T SG16 WP3 and ISO/IEC JTC1/SC29/WG11 6th Meeting: Torino, Italy, Jul. 14-22, 2011.
Van Der Auwera et al., "Support of varying QP in deblocking", Joint Collaborative Team on Video Coding (JCT-VC) of ITU-T SG16 WP3 and ISO/IEC JTC1/SC29/WG11 7th Meeting: Geneva, Switzerland, Nov. 21-30, 2011.
Woo-Shik Kim et al., "Non-CE8: Method of visual coding artifact removal for SAO", Joint Collaborative Team on Video Coding (JCT-VC) of ITU-T SG16 WP3 and ISO/IEC JTC1/SC29/WG11 7th Meeting, Nov. 21-30, 2011, pp. 2-8, JCTVC-G-580.
Andersson et al., "Modified SAO edge offsets," Document JCTVC-G490, Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, pp. 1-6
Bross et al., "WDS: Working Draft 5 of High-Efficiency Video Coding," Document JCTVC-G1103_d3, Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, 215 pages.
Kim et al., "Non-CE8: Method of visual coding artifact removal for SAO," Document JCTVC-G680, Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, pp. 1-7.

* cited by examiner

FIG. 5

| $p3_0$ $p2_0$ $p1_0$ $p0_0$ | $q0_0$ $q1_0$ $q2_0$ $q3_0$ |
| $p3_1$ $p2_1$ $p1_1$ $p0_1$ | $q0_1$ $q1_1$ $q2_1$ $q3_1$ |
| $p3_2$ $p2_2$ $p1_2$ $p0_2$ | $q0_2$ $q1_2$ $q2_2$ $q3_2$ |
| $p3_3$ $p2_3$ $p1_3$ $p0_3$ | $q0_3$ $q1_3$ $q2_3$ $q3_3$ |

METHOD OF APPLYING EDGE OFFSET

CROSS-REFERENCE TO RELATED APPLICATIONS

This application is a Continuation of copending U.S. application Ser. No. 14/349,451, filed on Apr. 3, 2014, which is the National Phase of PCT International Application No. PCT/CN2013/070222 on Jan. 8, 2013, which claims the benefit under 35 U.S.C. §119(a) to Patent Application No. 10-2012-0005334, filed in Korea on Jan. 17, 2012, all of which are hereby expressly incorporated by reference into the present application.

BACKGROUND OF THE INVENTION

1. Technical Field

The present invention relates to a sample adaptive offset method for reducing difference between original samples and reconstructed samples, and more particularly, to a method of adaptively adding an offset to reconstructed samples based on the difference between a current sample and neighboring samples.

2. Discussion of the Related Art

For compression of video data, a plurality of video standards has been developed. Such video standards are, for example, MPEG-2, MPEG-4 and H.264/MPEG-4 AVC. As a successor to H.264/MPEG-4 AVC, High Efficiency Video Coding (HEVC) is currently under joint development by the ISO/IEC Moving Picture Experts Group (MPEG) and ITU-T Video Coding Expert Group (VCEG).

According to HEVC, one picture is divided into largest coding units (LCUs), one or more coding units of each LCU are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficients of the quantized block are scanned by a predetermined scan type and then entropy-coded. The quantized coefficients are inversely quantized and inversely transformed to generate a residual block which is combined with the prediction block to generate reconstructed image. The reconstructed image is adaptively filtered using one or more deblocking filter to remove blocking artifacts.

But, the technique of deblocking filter described in H.264 and HEVC under development deteriorates decoding performance of a decoding apparatus because the technique is too complicated. Also, even if the deblocking filtering is applied to the block edges, the differences between the original samples and the filtered samples are still remained. To compensate the differences, sample adaptive offset (SAO) process is introduced. But, according to the current SAO process, the differences between the original samples and the filtered samples increase occasionally because the optimum edge index should not be determined.

Therefore, new technique is required to reduce the complexity of the post-processing and to improve the performance of the post-processing.

SUMMARY OF THE INVENTION

The present invention is directed to a method of an edge offset to reduce the difference between original samples and reconstructed samples and to reduce the quantity of bits required for compensating the differences.

One aspect of the present invention provides a method of applying an edge offset, comprising: generating an edge index of a current sample, and applying an edge offset corresponding to the edge index to the current sample. The edge index is generated using the differences between a current sample and two neighboring samples determined by an edge offset type.

A method according to the present invention generates an edge index of a current sample, and applies an edge offset corresponding to the edge index to the current sample. The edge index is generated using the differences between a current sample and two neighboring samples determined by an edge offset type. Accordingly, the difference between original samples and reconstructed samples are effectively reduced by generating the optimum edge index. Also, the quantity of bits required for reducing the differences are reduced by fixing the sign of offset to positive or negative.

BRIEF DESCRIPTION OF DRAWINGS

FIG. 5 is a conceptual diagram illustrating a 4-sample edge according to an embodiment of the present invention.

DETAILED DESCRIPTION OF THE INVENTION

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

A moving picture encoding apparatus and an moving picture decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 1:
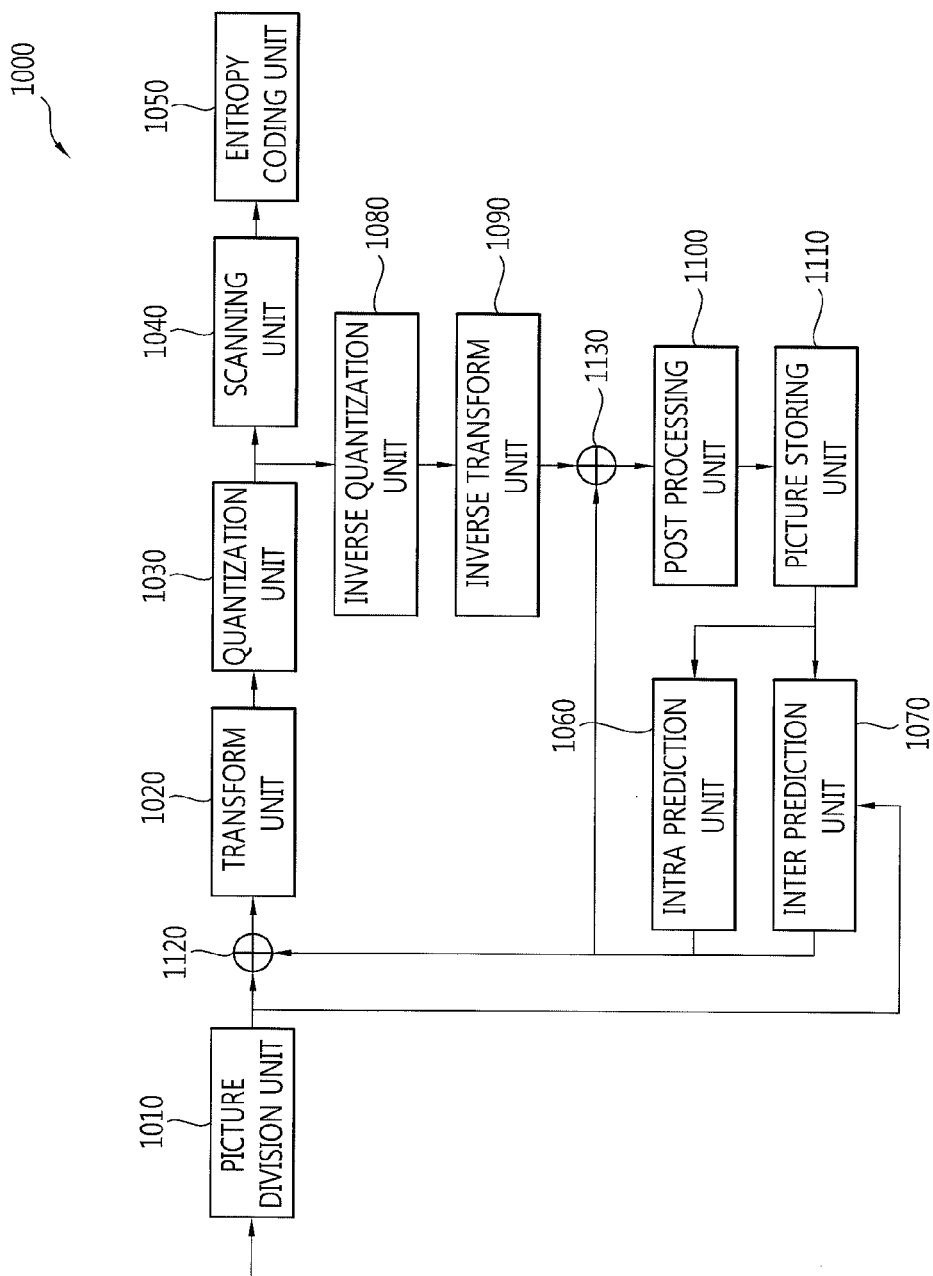
FIG. 1 is a block diagram illustrating a moving picture encoding apparatus according to an embodiment of the present invention.

FIG. 1 is a block diagram illustrating a moving picture encoding apparatus 1000 according to the present invention.

Referring to FIG. 1, the moving picture encoding apparatus 1000 includes a picture division unit 1010, a transform unit 1020, a quantization unit 1030, a scanning unit 1040, an entropy coding unit 1050, an intra prediction unit 1060, an inter prediction unit 1070, an inverse quantization unit 1080, an inverse transform unit 1090, a post-processing unit 1100, a picture storing unit 1110, a subtraction unit 1120 and an addition unit 1130.

The picture division unit 1010 divides a picture or a slice into plural largest coding units (LCUs), and divides each LCU into one or more coding units. The size of LCU may be 32×32, 64×64 or 128×128. The picture division unit 1010 determines prediction mode and partitioning mode of each coding unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags. The size of a coding unit is 2N×2N. If the size of the LCU is 64×64 and the size of a smallest coding unit (SCU) is 8×8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by the partitioning mode. The partitioning mode is one of 2N×2N, 2N×N, N×2N and N×N if the coding unit is partitioned symmetrically. The partitioning mode is one of 2N×nU, 2N×nD, nL×2N and nR×2N if the coding unit is partitioned asymmetrically.

A coding unit includes one or more transform units. The transform unit has a recursive quad tree structure to specify a division structure of the coding unit. The division structure is specified by one or more split transform unit flags. Parameters for specifying the maximum size and the minimum size of the transform unit are included in a sequence parameter set.

The transform unit 1020 transforms residual signals to generate a transformed block. The residual signals are transformed in a transform unit basis. The residual signals are derived by subtracting a prediction block which is generated by the intra prediction unit 1060 or the inter prediction unit 1070 from an original block.

Different transform matrix may be used according to the prediction mode (intra prediction mode or inter prediction mode). Also, in intra prediction mode, the transform matrix may be adaptively determined based on an intra prediction mode. The transform unit is transformed using two 1-dimensional transform matrixes (horizontal matrix and vertical matrix). For example, in horizontal intra prediction mode of intra prediction, a DCT-based integer matrix is applied to vertical direction and a DST-based or KLT-based integer matrix is applied to horizontal direction because the residual signals may have vertical directionality. In vertical intra prediction mode of intra prediction, a DCT-based integer matrix is applied to horizontal direction and a DST-based or KLT-based integer matrix is applied to vertical direction. Alternatively, the kind of transform matrix is determined based on the size of the transform unit.

The quantization unit 1030 determines a quantization parameter for quantizing the transformed block. The quantization parameter is a quantization step size. The quantization parameter is determined per a quantization unit. The quantization unit is a coding unit larger than or equal to a predetermined size. The predetermined size is called a minimum size of the quantization unit. The quantization unit having the minimum size is called a minimum quantization unit. If a size of the coding unit is equal to or larger than a minimum size of the quantization unit, the coding unit becomes the quantization unit. A plurality of coding units may be included in the minimum quantization unit. The minimum quantization unit may be an 8×8 block or a 16×16 block. The minimum size may be is determined per picture.

The quantization unit 1030 generates a quantization parameter predictor and generates a differential quantization parameter by subtracting the quantization parameter predictor from the quantization parameter. The differential quantization parameter is entropy-coded.

The quantization parameter predictor is generated as follows.

First Embodiment

The quantization parameters of a left coding unit, an above coding unit and an above-left coding unit are sequentially retrieved in this order. The quantization parameter predictor is generated using one or two available quantization parameters. For example, the first available quantization parameter is set as the quantization parameter predictor. Or an average of first two available quantization parameters is set as the quantization parameter predictor, and if only one quantization parameter is available, the available quantization parameter is set as the quantization parameter predictor.

Second Embodiment

There may be none of a left coding unit, an above coding unit and an above left coding unit of the current coding unit. On the other hand, there may be a previous coding unit of the current coding unit in coding order. Thus, the quantization parameters of neighboring coding units adjacent to the current coding unit and the previous coding unit may be used to generate the quantization parameter predictor. The quantization parameters are retrieved as the following order; 1) the quantization parameter of a left neighboring coding unit, 2) the quantization parameter of an above neighboring coding unit, 3) the quantization parameter of an above-left neighboring coding unit, and 4) the quantization parameter of the previous coding unit.

Alternatively, the quantization parameters are retrieved as the following order; 1) the quantization parameter of a left neighboring coding unit, 2) the quantization parameter of an above neighboring coding unit, and 3) the quantization parameter of the previous coding unit.

An average of first two available quantization parameters is set as the quantization parameter predictor when two or more quantization parameters are available, and when only one quantization parameter is available, the available quantization parameter is set as the quantization parameter predictor. For example, if the quantization parameters of the left and above coding units are available, an average of the left and above quantization parameters is set as the quantization parameter predictor. If only one of the quantization parameters of the left and above coding units is available, an average of the available quantization parameter and the quantization parameter of the previous coding unit is set as the quantization parameter predictor. If the quantization parameters of the left and above coding units are unavailable, the quantization parameter of the previous coding unit is set as the quantization parameter predictor. The average is rounded off.

The quantization unit 1030 quantizes the transformed block using a quantization matrix and the quantization parameter to generate a quantized block. The quantized block is provided to the inverse quantization unit 1080 and the scanning unit 1040.

The scanning unit 1040 scans the quantized coefficients and transforms the quantized coefficients into 1-dimensional quantized coefficient components applying a scan pattern to the quantized block.

In intra prediction mode, the distribution of the quantized coefficients varies according to the intra prediction mode and the size of the transform unit. Thus, the scan pattern is determined based on the intra prediction mode and the size of the transform unit. The scan pattern may be selected among a zigzag scan, vertical scan and horizontal scan. The zigzag scan may be replaced with a diagonal scan.

For example, if the size of the transform unit is equal to or smaller than 8×8, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the zigzag scan or the diagonal scan is selected for the other intra prediction modes. When the size of the transform unit is larger than 8×8, the zigzag scan or the diagonal scan is selected for all intra prediction modes.

In inter prediction mode, a predetermined scan pattern is used. The predetermined scan pattern may be a zigzag scan or a diagonal scan.

When the size of the transform unit is larger than a predetermined size, the quantized coefficients are divided into a plurality of subsets and then scanned. The predetermined size may be 4×4. The scan pattern for scanning the subsets is the same as the scan pattern for scanning quantized coefficients within each subset. The quantized coefficients within each subset are scanned in the reverse direction. The subsets are also scanned in the reverse direction.

A parameter indicating a last non-zero position is encoded and transmitted to the decoder. The last non-zero position specifies position of last non-zero quantized coefficient within the transform unit. A parameter indicating a position of a last non-zero quantized coefficient within each subset is also transmitted to the decoding apparatus.

The inverse quantization unit 1080 inversely quantizes the quantized coefficients. The inverse transform unit 1090 inversely transforms the inverse-quantized coefficients to generate residual signals.

The addition unit 1130 adds the residual signals generated by the inverse transform unit 1090 and prediction signals generated by the intra prediction unit 1060 or the inter prediction unit 1070. The subtraction unit 1120 subtracts prediction samples from original samples to generate residual signals.

The post-processing unit 1100 performs deblocking filtering process, a sample adaptive offset process, and an adaptive loop filtering process.

The deblocking filtering process is performed to remove blocking artifacts which appears in the reconstructed picture.

The sample adaptive offset process is performed after performing the deblocking filtering process to reduce difference between an original sample and a reconstructed sample. It is determined per picture or slice whether the sample adaptive offset process is performed or not. The picture or the slice may be divided into a plurality of offset areas, and an offset type may be determined per each area. There are four edge offset types and two band offset types. If the offset type is one of the edge offset types, an edge type is determined per each sample within the offset area, and an offset corresponding to the edge type is added to the each sample. The edge type is determined by comparing the current sample with neighboring two samples.

The adaptive loop filtering process may be performed by comparing the reconstructed image and an original image to obtain filter coefficients. The filter coefficients are applied all samples within 4×4 block or 8×8 block. Whether the adaptive loop filtering is performed or not is determined per coding unit. Therefore, the size and coefficients of the loop filter may be changed on a coding unit basis.

The picture storing unit 1110 receives reconstructed pictures from the post-processing unit 1100 and stores them in a memory. The picture is a frame-based picture or a field-based picture.

The inter prediction unit 1070 performs motion estimation using one or more pictures stored in the picture storing unit 1110, and determines one or more reference picture indexes specifying one or more reference pictures and one or more motion vectors. The inter prediction unit 1070 generates a prediction block using the one or more reference picture indexes and the one or more motion vectors.

The intra prediction unit 1060 determines an intra prediction mode of a current prediction unit and generates a prediction block using the intra prediction mode.

The entropy coding unit 1050 entropy-codes the quantized coefficient components received from the scanning unit 1040, intra prediction information received from the intra prediction unit 1060, motion information received from the inter prediction unit 1070.

Figure 2:
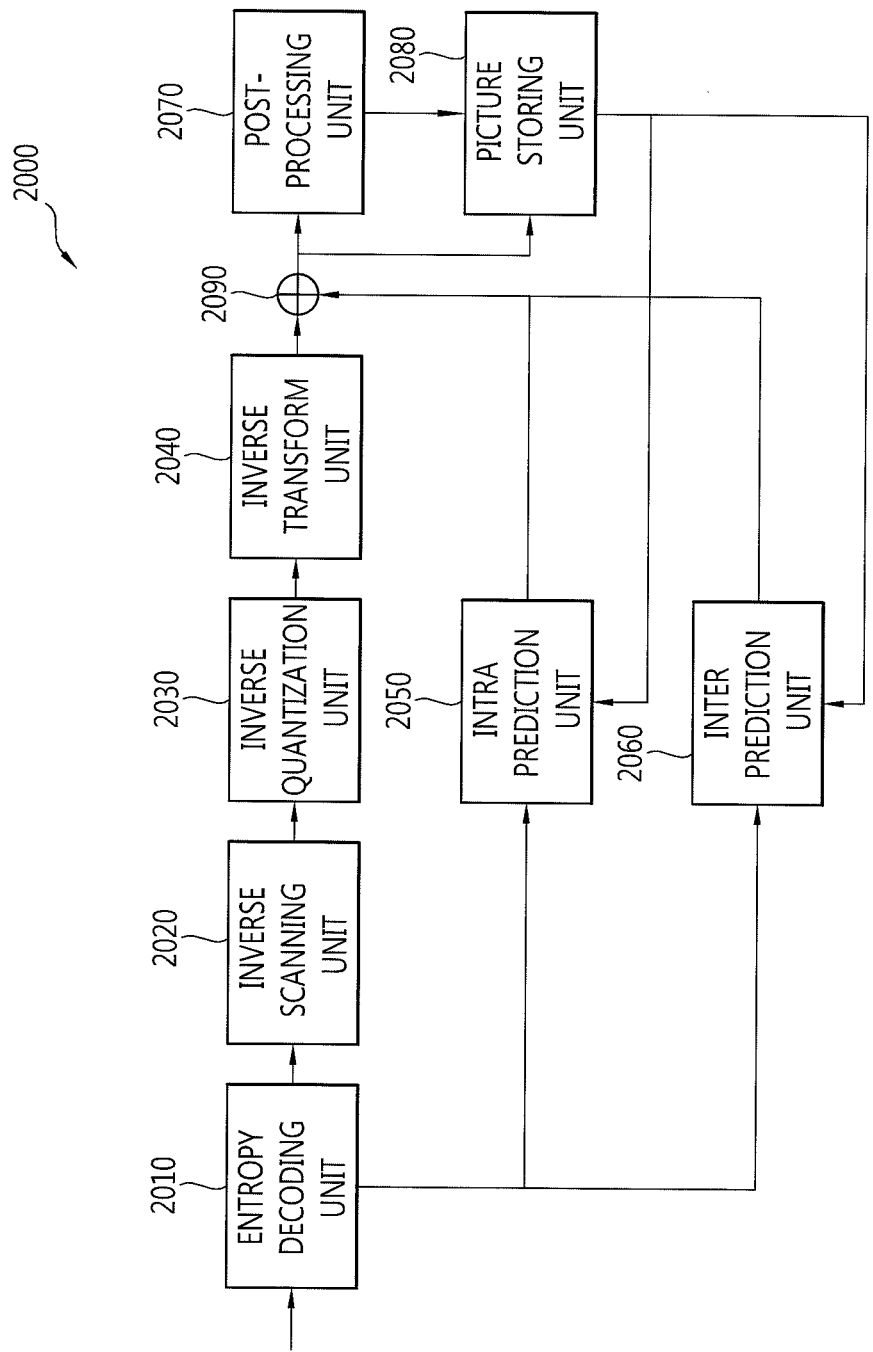
FIG. 2 is a block diagram illustrating a moving picture decoding apparatus according to an embodiment of the present invention.

FIG. 2 is a block diagram illustrating a moving picture decoding apparatus 2000 according to the present invention.

As shown in FIG. 2, the moving picture decoding apparatus 2000 includes an entropy decoding unit 2010, an inverse scanning unit 2020, an inverse quantization unit 2030, an inverse transform unit 2040, an intra prediction unit 2050, an inter prediction unit 2060, a post-processing unit 2070, a picture storing unit 2080 and an addition unit 2090.

The entropy decoding unit 2010 extracts and entropy-decodes the intra prediction information, the inter prediction information and the quantized coefficient components from a received bit stream. The entropy decoding unit 2010 transmits the inter prediction information to the inter prediction unit 2060, transmits the intra prediction information to the intra prediction unit 2050, and transmits the quantized coefficient components to the inverse scanning unit 2020.

The inverse scanning unit 2020 transforms the quantized coefficient components into 2-dimensional quantized block using an inverse scan pattern.

In intra prediction mode, the inverse scan pattern is selected based on the intra prediction mode and the size of the transform unit. The inverse scan pattern may be selected among a zigzag scan, vertical scan and horizontal scan. The zigzag scan may be replaced with a diagonal scan.

For example, if the size of the transform unit is equal to or smaller than 8×8, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the zigzag scan or the diagonal scan is selected for the other intra prediction modes. When the size of the transform unit is larger than 8×8, the zigzag scan or the diagonal scan is selected for all intra prediction modes.

In inter prediction mode, a predetermined scan pattern is used. The predetermined scan pattern may be a zigzag scan or a diagonal scan.

If the size of the current transform unit is larger than a predetermined size, the quantized coefficient components are inversely scanned in a subset basis to construct the quantized block. The subset has the predetermined size. The predetermined size may be 4×4. If the size of the transform unit is equal to the predetermined size, the quantized coefficient components of the transform unit are inversely scanned to construct the transform unit. When the quantized coefficient components are inversely scanned in a subset basis, the same inverse scanning pattern is applied to the quantized coefficient components of each subset.

The multiple subsets are inversely scanned in reverse direction. The quantized coefficient components are also inversely scanned in reverse direction. The inverse scan pattern applied to the quantized coefficient components to construct a subset is the same as the inverse scan pattern applied to the multiple constructed subsets. The inverse scanning unit 2020 performs inverse scanning using the parameter indicating a position of a last non-zero quantized coefficient of the transform unit.

The inverse quantization unit 2030 receives the differential quantization parameter from the entropy decoding unit 2010 and generates a quantization parameter predictor to obtain a quantization parameter of a current coding unit.

The quantization parameter predictor is generated as follows

First Embodiment

The quantization parameters of a left coding unit, an above coding unit and an above-left coding unit are sequentially retrieved in this order. The quantization parameter predictor is generated using one or two available quantization parameters. For example, the first available quantization parameter is set as the quantization parameter predictor. Or an average of first two available quantization parameters is set as the quantization parameter predictor, and if only one quantization parameter is available, the available quantization parameter is set as the quantization parameter predictor.

Second Embodiment

There may be none of a left coding unit, an above coding unit and an above left coding unit of the current coding unit. On the other hand, there may be a previous coding unit of the current coding unit in coding order. Thus, the quantization parameters of neighboring coding units adjacent to the current coding unit and the previous coding unit may be used to generate the quantization parameter predictor. The quantization parameters are retrieved as the following order; 1) the quantization parameter of a left neighboring coding unit, 2) the quantization parameter of an above neighboring coding unit, 3) the quantization parameter of an above-left neighboring coding unit, and 4) the quantization parameter of the previous coding unit.

Alternatively, the quantization parameters are retrieved as the following order; 1) the quantization parameter of a left neighboring coding unit, 2) the quantization parameter of an above neighboring coding unit, and 3) the quantization parameter of the previous coding unit.

An average of first two available quantization parameters is set as the quantization parameter predictor when two or more quantization parameters are available, and when only one quantization parameter is available, the available quantization parameter is set as the quantization parameter predictor. For example, if the quantization parameters of the left and above coding units are available, an average of the left and above quantization parameters is set as the quantization parameter predictor. If only one of the quantization parameters of the left and above coding units is available, an average of the available quantization parameter and the quantization parameter of the previous coding unit is set as the quantization parameter predictor. If the quantization parameters of the left and above coding units are unavailable, the quantization parameter of the previous coding unit is set as the quantization parameter predictor. The average is rounded off.

The inverse quantization unit 2030 generates the quantization parameter of the current coding unit by adding the differential quantization parameter and the quantization parameter predictor. If the differential quantization parameter for the current coding unit is not transmitted from an encoding side, the differential quantization parameter is set to zero. The quantization parameter is generated per quantization unit.

The inverse quantization unit 2030 inversely quantizes the quantized block.

The inverse transform unit 2040 inversely transforms the inverse-quantized block to generate a residual block. The inverse transform matrix type is determined based on the prediction mode (intra prediction mode or inter prediction mode) and the size of the transform unit.

The addition unit 2090 generates reconstructed samples by adding the residual block and a prediction block.

The intra prediction unit 2050 recovers the intra prediction mode of the current prediction unit based on the intra prediction information received from the entropy decoding unit 2010, and generates a prediction block according to the intra prediction mode.

The inter prediction unit 2060 recovers one or more reference picture indexes and one or more motion vectors based on the inter prediction information received from the entropy decoding unit 2010, and generates a prediction block using the one or more reference pictures and the one or more motion vectors.

The operation of the post-processing unit 2070 is the same of the post-processing unit 1100 of FIG. 1.

The picture storing unit 2080 stores pictures which is post-processed by the post-processing unit 2070.

Figure 3:
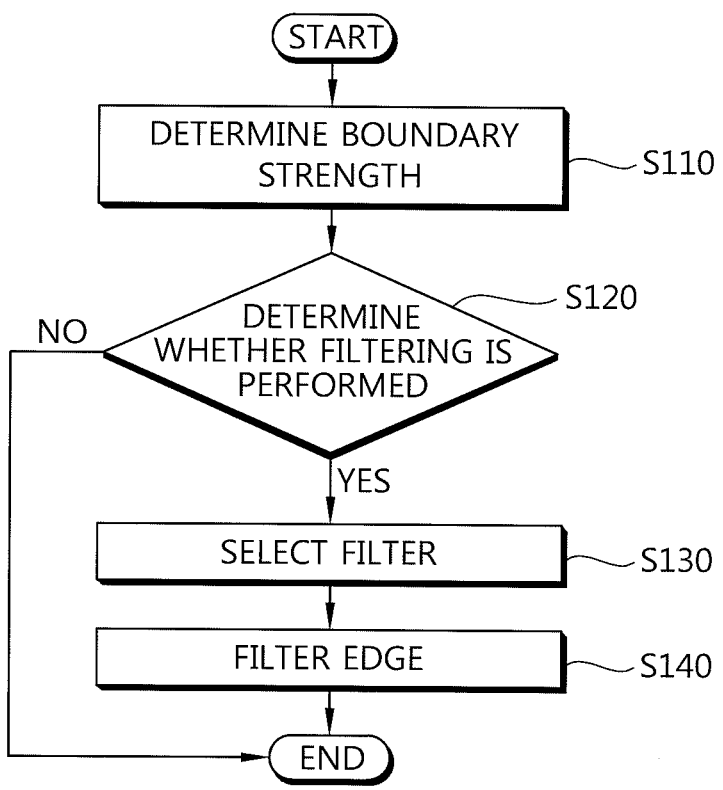
FIG. 3 is a flow chart illustrating a deblocking filtering process according to an embodiment of the present invention.

FIG. 3 is a flow chart illustrating a deblocking filtering process according to the present invention.

The deblocking filtering process is performed by the post-processing unit 1100 of the moving picture encoding apparatus 1000 shown in FIG. 1 and by the post-processing unit 2070 of the moving picture decoding apparatus 2000 shown in FIG. 2.

When it is determined that deblocking filtering is performed on a slice, the deblocking filtering process is applied to the slice. The moving picture decoding apparatus uses a flag 'diable_deblocking_filter_flag' received from a bit stream to determine whether the deblocking filtering is performed or not per slice.

The deblocking filtering is performed on each coding unit. The vertical edges are filtered first starting with the edge of the left-hand side of the coding unit toward the right-hand side of the coding unit. Then the horizontal edges are filtered starting with the edge on the top of the coding unit towards the bottom of the coding unit.

The deblocking filter is applied only to the prediction unit edges and the transform unit edges. If the width or height of the prediction unit or the transform unit is smaller than 8-sample length, the deblocking filter is applied only to the edges lying on 8×8 sample grid.

The boundary strength is determined on each 4-sample edge lying on 8×8 sample grid (S110).

Figure 4:
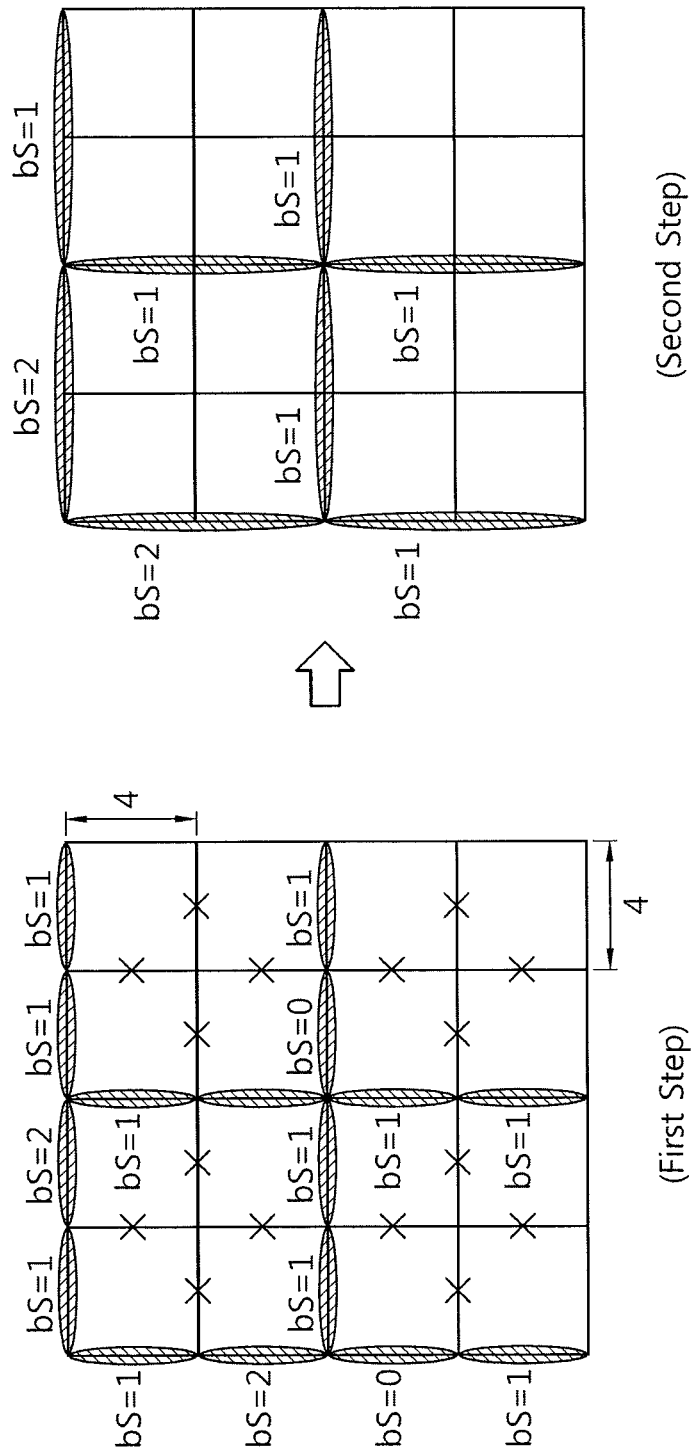
FIG. 4 is a conceptual diagram illustrating a method of determining the boundary strength according to an embodiment of the present invention.

FIG. 4 is a conceptual diagram illustrating a method of determining the boundary strength according to the present invention.

As shown in FIG. 4, the boundary strength is determined on each 4-sample edge lying 8×8 sample grid. Then, the boundary strength is determined on edges of 8×8 block using two consecutive boundary strength.

Accordingly, the computational complexity required to determine the boundary strength according to the present invention is reduced by 50% when compared with the HEVC under development. Also, the present invention reduces the memory capacity and bandwidth required to determine the boundary strength by 50%. Therefore, the present invention reduces the complexity of hardware and software without deterioration of image quality.

FIG. 5 is a conceptual diagram illustrating a 4-sample edge according to the present invention. As shown in FIG. 5, the 4-sample edge is located between a P block containing sample p0 and a Q block containing sample q0. The sample p0 corresponds to one of the samples $p0_0$~$p0_3$, and the sample q0 corresponds one of the samples $q0_0$~$q0_3$. The block P and Q is a prediction unit or a transform unit.

The boundary strength is determined as follows. The boundary strength is determined per 4-sample edge.

If the prediction unit containing the sample p0 or the prediction unit containing the sample q0 is intra-coded, the boundary strength of the 4-sample edge is set equal to 2. The 4-sample edge is a prediction unit edge. That is, if the block P and block Q are inter-coded, the boundary strength is set equal to 0 or 1.

If one or more following conditions are satisfied, the boundary strength is set equal to 1.

1) The 4-sample edge is a transform unit edge, the transform unit containing the sample p0 or the transform unit containing the sample q0 contains one or more non-zero transform coefficients.

2) The 4-sample edge is a prediction unit edge, the prediction unit containing the sample p0 and the prediction unit containing the sample q0 are inter-coded, and the prediction unit containing the sample p0 or the prediction unit containing the sample q0 have different reference pictures or a different number of motion vectors.

3) The prediction unit containing the sample p0 and the prediction unit containing the sample q0 are inter-coded, the prediction unit containing the sample p0 and the prediction unit containing the sample q0 have one motion vector, and the absolute difference between the horizontal or vertical component of the motion vectors is greater than or equal to a predetermined value (for example, 1 sample). The edge is not a part of a horizontal boundary of LCU.

4) The prediction unit containing the sample p0 and the prediction unit containing the sample q0 are inter-coded, the prediction unit containing the sample p0 and the prediction unit containing the sample q0 have two motion vectors, the prediction unit containing the sample p0 and the prediction unit containing the sample q0 have at least one same reference picture, and the absolute difference between the horizontal or vertical component of two motion vectors corresponding to the same reference picture is greater than or equal to the predetermined value. The edge is not a part of a horizontal boundary of LCU.

As described above, if the 4-sample edge is not lying on the 8×8 sample grid, the boundary strength is set equal to 0.

On the other hand, when the edge is a horizontal edge of LCU and a prediction unit containing the sample p0 is located above the horizontal edge of LCU, the motion information of the prediction unit containing the sample p0 may be replaced with the motion information of a left or right neighboring prediction unit of the prediction unit containing the sample p0 based on the size and/or location of the prediction unit containing the sample p0.

Next, it is determined whether deblocking filtering is performed or not on the 4-sample edge (S120).

For 4-sample edge, deblocking filtering is performed if the following two conditions are satisfied.

$$bS > 0 \quad\quad\quad 1)$$

$$d < \beta \quad\quad\quad 2)$$

The bS represents a boundary strength. The value of the variable $\beta$ is determined based on a boundary quantization parameter $QP_B$.

The variable d is defined as follows.

$$d = d_{p0} + d_{q0} + d_{p3} + d_{q3} \quad\quad\quad 1)$$

$$d_{pk} = |p2_k - 2 \cdot p1_k + p0_k| \text{ and } d_{qk} = q2_k - 2 \cdot q1_k + q0_k \quad\quad\quad 2)$$

Next, if it is determined that deblocking filtering is applied to the 4-sample edge, one deblocking filter is selected among a strong filter and a weak filter. But, if it is determined that deblocking filtering is not applied to the 4-sample edge, the deblocking filtering process ends for that edge. As shown in FIG. 5, a filter is selected for each 4-smaple edge.

If the following conditions are satisfied, the strong filter is selected.

$$d < (\beta >> 2) \quad\quad\quad 1)$$

$$|p3_i - p0_i| + |q3_i - q0_i| < (\beta 3 >> 3) \text{ for each } i, i=0,3 \quad\quad\quad 2)$$

$$|p0_i - q0_i| < (5 * t_c + 1) >> 1 \text{ for each } i, i=0,3 \quad\quad\quad 3)$$

Or $$d < (\beta >> 1) \text{ for each } i, i=0,3 \quad\quad\quad 1)$$

$$|p3_i - p0_i| + |q3_i - q0_i| < (\beta 3 >> 3) \text{ for each } i, i=0,3 \quad\quad\quad 2)$$

$$|p0_i - q0_i| < (5 * t_c + 1) >> 1 \text{ for each } i, i=0,3 \quad\quad\quad 3)$$

Otherwise, the weak filter is selected. The value of the variable $t_c$ is determined based on the boundary quantization parameter $QP_B$.

Next, if the deblocking filter is selected, the edge is filtered using the deblocking filter (S140).

The strong filter is as follows.

$$p_0' = (p_2 \pm 2*p_1 + 2*p_0 + 2*q_0 + q_1 + 4) >> 3)$$

$$p_1' = (p_2 + p_1 + p_0 + q_0 + 2) >> 2$$

$$p_2' = (2*p_3 + 3*p_2 + p_1 + p_0 + q_0 + 4) >> 3$$

$$q_0' = (p_1 + 2*p_0 + 2*q_0 + 2*q_1 + q_2 + 4) >> 3$$

$$q_1' = (p_0 + q_0 + q_1 + q_2 + 2) >> 2$$

$$q_2' = (p_0 + q_0 + q_1 3*q_2 + 2*q_3 + 4) >> 3$$

The weak filter is as follows.

$$\Delta = \text{Clip3}(-t_C, t_C, \Delta)$$

$$p_0' = \text{Clip1}(p_0 + \Delta)$$

$$q_0' = \text{Clip1}(q_0 - \Delta)$$

$$\Delta p = \text{Clip3}(-(t_C>>1), t_C>>1, (((p_2+p_0+1)>>1)-p_1+\Delta)>>1)$$

$$p_1' = \text{Clip1}(p_1+\Delta p)$$

$$\Delta q = \text{Clip3}(-(t_C>>1), t_C>>1, (((q_2+q_0+1)>>1)-q_1-\Delta)>>1)$$

$$q_1 = \text{Clip1}(q_1+\Delta q)$$

The variables $\beta$ and $t_c$ are determined by the boundary quantization parameter $QP_B$, and increases monotonically as the boundary quantization parameter $QP_B$ increases. The relation between the parameters $\beta$ and $t_c$ and the quantization parameter is defined as a table.

The boundary quantization parameter $QP_B$ is an average of the quantization parameter $QP_P$ of P block containing sample p0 and $QP_Q$ of Q block containing sample q0. The average is a value rounded off. If at least one of P block and Q block is intra-coded, the parameter $t_c$ increases by 0, 1 or 2 as the $QP_B$ increases by 1.

Now, the sample adaptive offset process according to the present invention is described. The sample adaptive offset process is performed by the post-processing unit 1100 of the moving picture encoding apparatus 1000 shown in FIG. 1 and by the post-processing unit 2070 of the moving picture decoding apparatus 2000 shown in FIG. 2.

Figure 6:
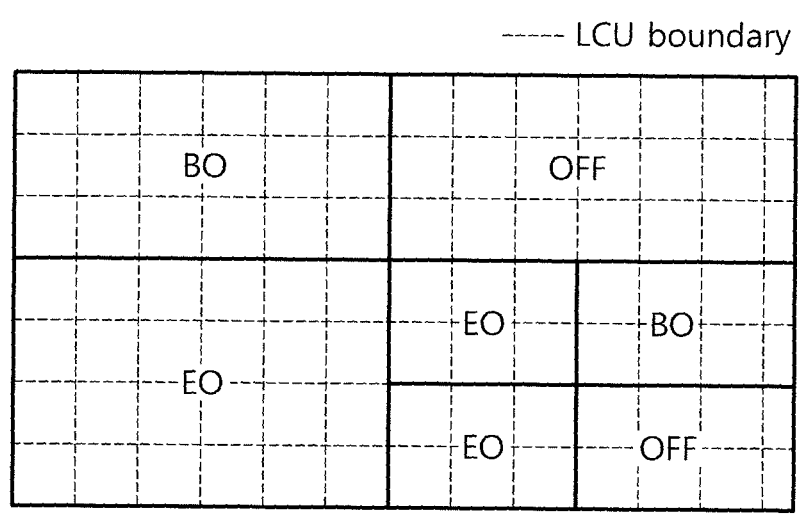
FIG. 6 is a conceptual diagram illustrating a method of dividing a picture into multiples areas according to an embodiment of the present invention.

FIG. 6 is a conceptual diagram illustrating a method of dividing a picture into multiples areas according to the present invention. A SAO type is defined per area.

As shown in FIG. 6, the areas are generated by dividing a picture in a quadtree structure. The area may be an LCU. There are three kinds of SAO types. If the SAO type is the first type (OFF), the SAO process is not performed on the corresponding area. If SAO type indicates band offset (BO), a band offset is added to each sample within the area. If SAO type indicates edge offset (EO), an edge offset determined by an edge index is added to each sample within the area.

Figure 7:
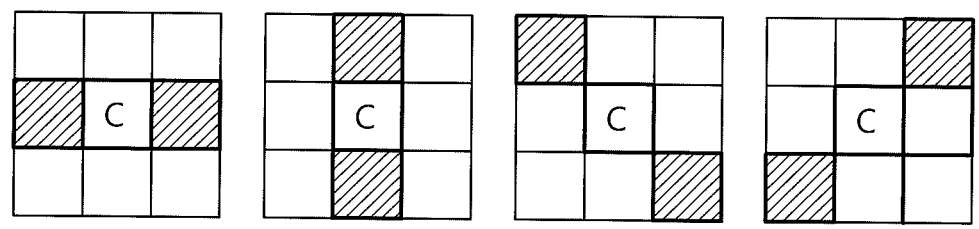
FIG. 7 is a conceptual diagram illustrating edge types according to an embodiment of the present invention.

FIG. 7 is a conceptual diagram illustrating edge types according to the present invention.

As shown in FIG. 7, there exist four edge types in the edge offset. The edge type is determined by positions of neighboring samples used to derive an edge index. The first edge type indicates 1D 0-degree edge type, the second edge type indicates 1D 90-degree edge type, the third edge type indicates 1D 135-degree edge type, and the fourth edge type indicates 1D 90-degree edge type. The sample C represents a current sample and the two shaded samples represent two neighboring samples determined by the edge type.

The sample adaptive offset process is performed as follows when the sample adaptive offset type indicates one of edge offset types according to the present invention.

First, an edge index is derived using the differences between a current sample and two neighboring samples. The two neighboring samples are determined by the edge offset type of a current area. The edge index is derived per sample within the current area. The edge index is derived as follows.

$$\text{edgeIdx} = 2 + \text{sign3}(\text{recPicture}(x) - \text{recPicture}(x-1)) + \text{sign3}(\text{recPicture}(x) - \text{recPicture}(x+1))$$

The function sign3(y) is equal to 1 if the y is larger than 0, the function sign3(y) is equal to −1 if the y is smaller than 0, and the function sign3(y) is equal to 0 if the y is equal to 0.

The variable recPicture(x) represents the current sample value, the variables recPicture(x−1) and recPicture(x+1) represent the two neighboring sample values. The two neighboring samples are determined by the edge offset type of the current area.

Figure 8:
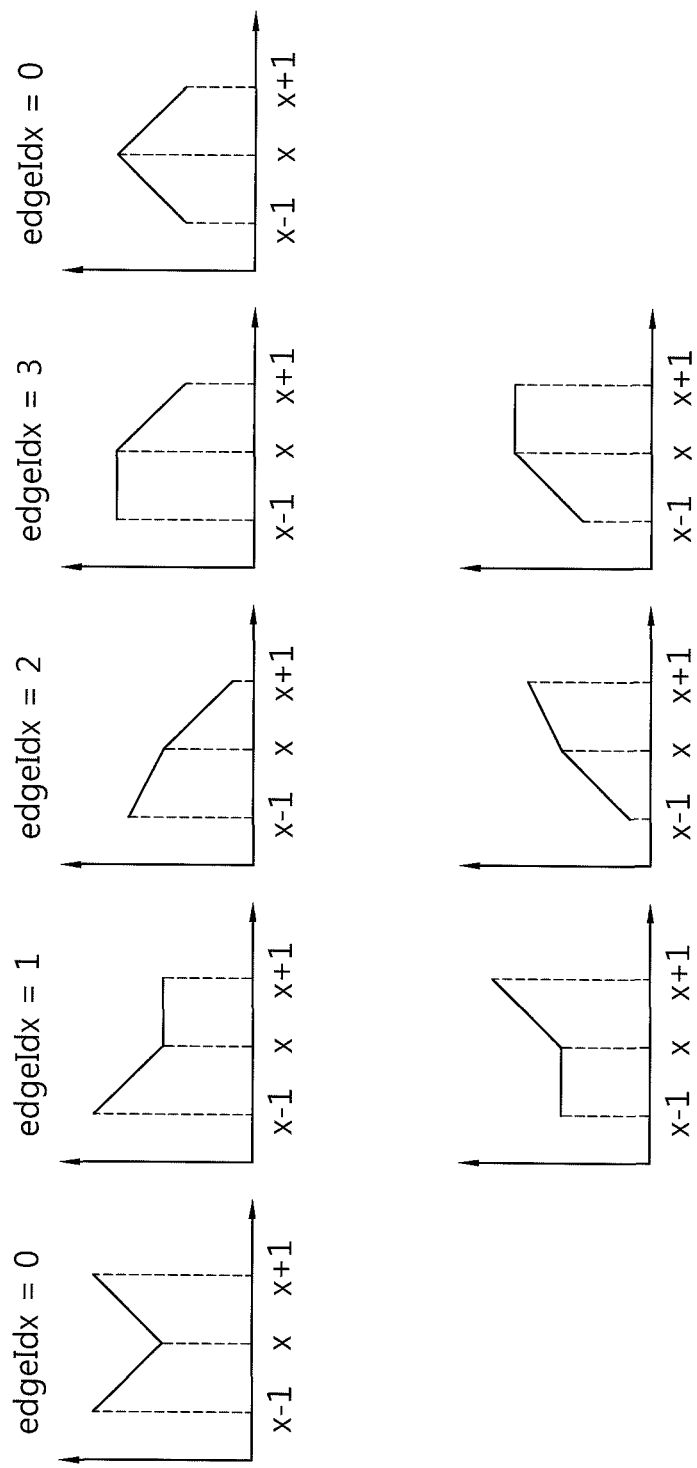
FIG. 8 is a conceptual diagram illustrating edge indexes according to an embodiment of the present invention.

FIG. 8 is a conceptual diagram illustrating edge indexes according to the present invention. In FIG. 8, the horizontal axis represents sample position and the vertical axis represents sample value.

As shown in FIG. 8, the edge index is set to 0 if both of the two neighboring sample values are larger than the current sample value, the edge index is set to 1 if one of the two neighboring sample values is larger than the current sample and the other is equal to the current sample value, the edge index is set to 2 if one of the two neighboring sample values is larger than the current sample and the other is smaller than the current sample value, the edge index is set to 3 if one of the two neighboring sample values is smaller than the current sample and the other is equal to the current sample value, and the edge index is set to 4 if both of the two neighboring sample values are smaller than the current sample. The edge index is also set to 2 if both of the two neighboring sample values are equal to the current sample.

Meanwhile, when one of the two neighboring samples belongs to another LCU, the edge offset may be not applied to the current sample or another neighboring sample within the current LCU is used instead of the neighboring sample belonging to the another LCU.

Next, an edge offset is added to the current sample as follows.

$$\text{recSaoPicture}(x) = \text{recPicture}(x) + \text{Edge\_Offset}[\text{edgeIdx}]$$

The edge offset is determined based on the edge index. In the moving picture decoding apparatus 2000, the edge offset is obtained from a bit stream transmitted from the moving picture encoding apparatus 1000. The moving picture encoding apparatus 1000 may transmits 4 or 5 edge offsets. If 4 edge offsets are transmitted, the edge offsets correspond to the edge indexes 0, 1, 3, 4 respectively, the edge offset is considered as 0 for edge index 2.

The edge offset may be a positive value or a negative value. The quantity of bits required to transmit the 4 edges offsets increases as the area is larger. A method of reducing the quantity of bits according to the present invention is as follows.

First Embodiment

A positive offset is applied to the edge index 0 and a negative offset is applied to the edge index 4. That is, only the absolute values of the two edge offsets are transmitted to reduce the quantity of bits. For edge indexes 1 and 3, the absolute value and sign of the edge offset are transmitted.

Second Embodiment

A positive offset is applied to the edge indexes 0 and 1 and a negative offset is applied to the edge indexes 3 and 4. That is, only the absolute values of the four edge offsets are transmitted to reduce the quantity of bits.

Furthermore, the offset is not added to the current sample if the difference between the current sample and a neighboring sample is larger than a threshold. For example, if the absolute value of the difference between the current sample and a neighboring sample is larger than the threshold, the offset value is set to 0. Otherwise, the negative offset or the positive offset is used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus of post-processing a reconstructed image, the apparatus comprising:
 a deblocking filter for determining a boundary strength for a 4-sample edge which is a prediction edge or a transform edge and lies on an 8×8 sample grid, determining whether deblocking filtering is applied on the 4-sample edge or not using the boundary strength and a boundary quantization parameter, and filtering the 4-sample edge if the deblocking filtering is applied on the 4-sample edge; and
 a sample adaptive offset adder for, if a sample adaptive offset type indicates an edge offset, generating an edge index of a current sample, generating an edge offset corresponding to the edge index to the current sample, and adding the edge offset to the current sample,
 wherein the edge index is generated using the following equation:

$$edgeIdx = 2 + \text{sign3}(recPicture(x) - recPicture(x-1)) + \text{sign3}(recPicture(x) - recPicture(x+1)),$$

wherein the function sign3(y) is equal to 1 if the y is larger than 0, the function sign3(y) is equal to −1 if the y is smaller than 0, and the function sign3(y) is equal to 0 if the y is equal to 0,
 wherein the variable recPicture(x) represents the current sample value, the variables recPicture(x−1) and recPicture(x+1) represent two neighboring sample values,
 wherein the boundary quantization parameter is an average of a quantization parameter of a P block containing sample p0 and a quantization parameter of a Q block containing sample q0, the quantization parameter of the P block is generated by using a quantization parameter predictor and a differential quantization parameter of the P block, and if two or more quantization parameters are available among a left quantization parameter, an above quantization parameter and a previous quantization parameter of the P block, the quantization parameter predictor of the P block is generated using two available quantization parameters which are determined according to an order of the left quantization parameter, the above quantization parameter and the previous quantization parameter, and
 wherein the deblocking filter filters vertical edges first, and then filters horizontal edges.

2. The apparatus of claim 1, wherein the two neighboring samples are determined by an edge offset type of a current area.

3. The apparatus of claim 1, wherein the edge offset is set as negative or positive based on the edge index.

4. The apparatus of claim 3, wherein the edge offset is set as positive if the edge index is equal to 0 or 1.

5. The apparatus of claim 3, wherein the edge offset is set as negative if the edge index is equal to 3 or 4.

6. The apparatus of claim 1, wherein the edge offset is set to 0 if the edge index is equal to 2.

7. The apparatus of claim 1, wherein if one of the two neighboring samples belongs to another LCU, the edge offset is not applied to the current sample.

8. The apparatus of claim 1, wherein if one of the two neighboring samples belongs to another LCU, the neighboring sample belonging to another LCU is replaced with another sample within LCU.

9. The apparatus of claim 1, wherein if only one quantization parameter is available among the left quantization parameter, the above quantization parameter and the previous quantization parameter of the P block, the available quantization parameter is set as the quantization parameter predictor of the P block.

* * * * *